No. 804,121. PATENTED NOV. 7, 1905.
G. B. HAWKINS.
MOWER PITMAN.
APPLICATION FILED MAY 5, 1905.

Witnesses
C. C. Hunt
C. H. Griesbauer

Inventor
George B. Hawkins
by H. B. Willson
Attorney

UNITED STATES PATENT OFFICE.

GEORGE B. HAWKINS, OF SHEPHERD, MICHIGAN.

MOWER-PITMAN.

No. 804,121.　　　　Specification of Letters Patent.　　　　Patented Nov. 7, 1905.

Application filed May 5, 1905. Serial No. 259,012.

*To all whom it may concern:*

Be it known that I, GEORGE B. HAWKINS, a citizen of the United States, residing at Shepherd, in the county of Isabella and State of Michigan, have invented certain new and useful Improvements in Mower-Pitmen; and I do declare the following to be a full, clear, and exact description of the invention, such as will enable others skilled in the art to which it appertains to make and use the same.

This invention relates to improvements in mower-pitmen; and the object of the invention is to provide a pitman so constructed that the same will pass freely over the grass and hay without bunching or rolling the same.

A further object is to provide an improved means for connecting the pitman-rod with the cutter-bar whereby the latter may be readily attached to and detached from the pitman-rod.

With these and other objects in view the invention consists of certain novel features of construction, combination, and arrangement of parts, as will be more fully described, and particularly pointed out in the appended claims.

Figure 1:
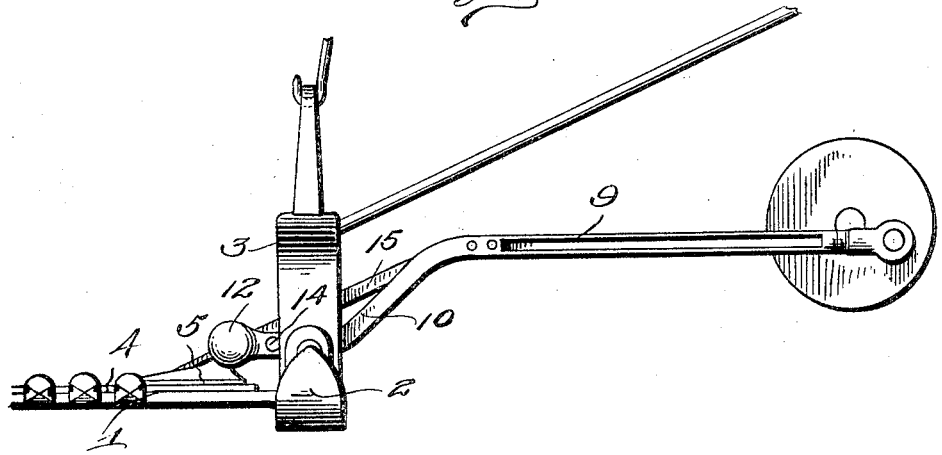
Figure 2:
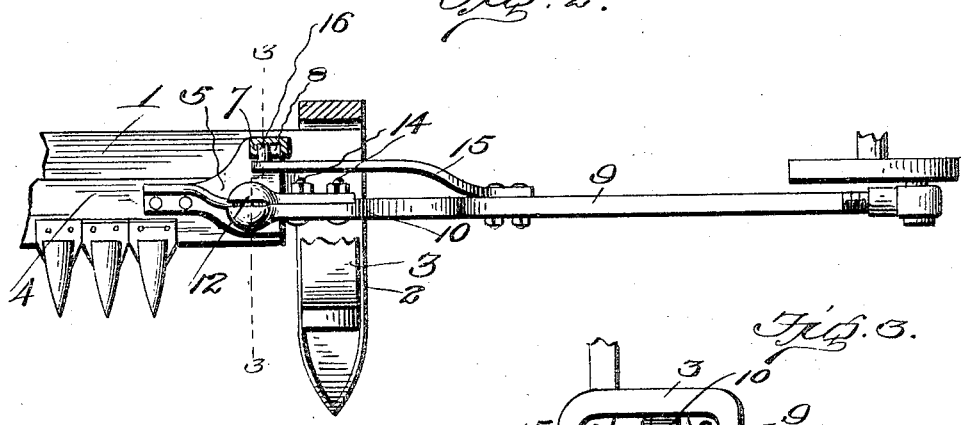
Figure 3:
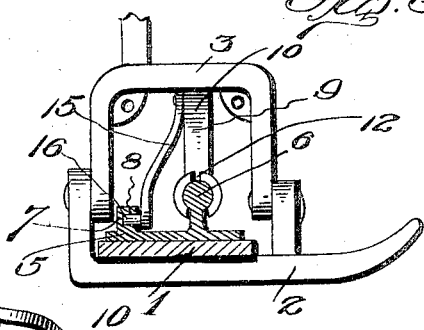
Figure 4:
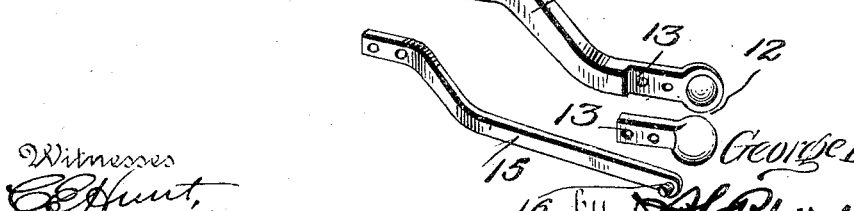

In the accompanying drawings, Figure 1 is a side view of a portion of a mower finger-bar, showing the improved pitman-rod connected to the cutter-bar thereon. Fig. 2 is a top plan view of the same. Fig. 3 is a transverse vertical sectional view taken on the line 3 3 of Fig. 2, and Fig. 4 is a detail perspective view of a pitman-rod and brace detached from the cutter-bar.

Referring more particularly to the drawings, 1 denotes the finger-bar, 2 the shoe connected to the inner end of the same, and 3 denotes the yoke, which is pivotally connected to the shoe, as shown. Slidably mounted on the finger-bar in the usual manner is the cutter-bar 4, on the inner end of which is arranged the usual head 5. On the head 5 is formed the ball member 6 of a pitman-rod joint. On the head 5 is also formed an upwardly-projecting lug 7, having an elongated aperture 8.

The pitman-rod 9 consists of a bar having a downwardly-curved outer end 10, on which is formed a socket member 12 of the pitman-rod joint. The socket member 12 is formed in two parts, one of which is integral with the end of the pitman-rod and is provided with bolt-holes 13 to receive bolts 14, by which the detached member of the socket is secured to the integral member thereof after the same has been applied to the ball 6 on the head of the cutter-bar, thus connecting the end of the pitman-rod with the cutter-bar. Secured to the outer end of the pitman-rod is a downwardly-curved brace-bar 15, having on its outer end a laterally-projecting lug 16, said lug being attached to and projecting into the elongated aperture 8, formed in the lock 7 on the cutter-bar head, thereby loosely connecting the end of the brace-bar 15 with the cutter-bar head 5.

By forming the pitman-rod with a downwardly-curved connecting end the main portion of said rod will be elevated considerably above the level of the ordinary form of pitmen-rods, thus allowing the same to pass freely over the mown grass or hay, which will prevent the same from being bunched or rolled, which condition materially interferes with the curing process of the hay.

From the foregoing description, taken in connection with the accompanying drawings, the construction and operation of the invention will be readily understood without requiring a more extended explanation.

Having thus described my invention, what I claim as new, and desire to secure by Letters Patent, is—

1. A mower-pitman having a downwardly-curved outer end, means whereby said end is connected to the cutter-bar head, and a brace-bar connected to said pitman and loosely engaging said cutter-bar head, substantially as described.

2. In a device of the character described, a cutter-bar head, a mower-pitman having a downwardly-curved cutter-bar attachment end, a separable socket member of a cutter-bar joint arranged on said end of the pitman, said socket member being adapted to engage the ball member of the joint formed on said cutter-bar head, a brace-bar connected at its upper end to said pitman, there being a laterally-projecting lug formed on the lower end of said brace and engaging an elongated opening formed in an attaching-lug on said cutter-bar head, substantially as described.

In testimony whereof I have hereunto set my hand in presence of two subscribing witnesses.

GEORGE B. HAWKINS.

Witnesses:
　R. D. MATTHEWS,
　C. H. JONES.